Jan. 28, 1964 — L. R. DAVIS — 3,119,288
PORTABLE TOOL FOR MACHINING CONDUIT ENDS
Filed July 13, 1961 — 3 Sheets-Sheet 1

INVENTOR.
LLOYD R. DAVIS
BY
Burns, Doane, Benedict, Swecker & Mathis
ATTORNEYS.

Jan. 28, 1964 L. R. DAVIS 3,119,288
PORTABLE TOOL FOR MACHINING CONDUIT ENDS
Filed July 13, 1961 3 Sheets-Sheet 2
FIG 3
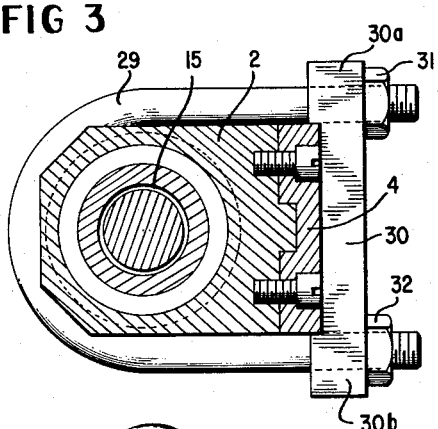
FIG 4
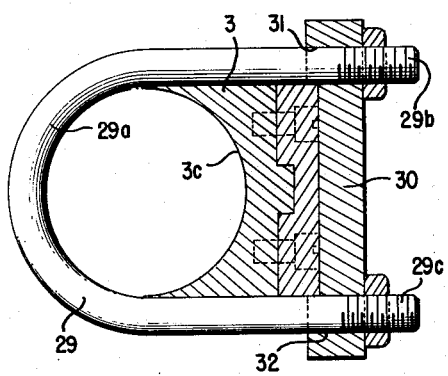
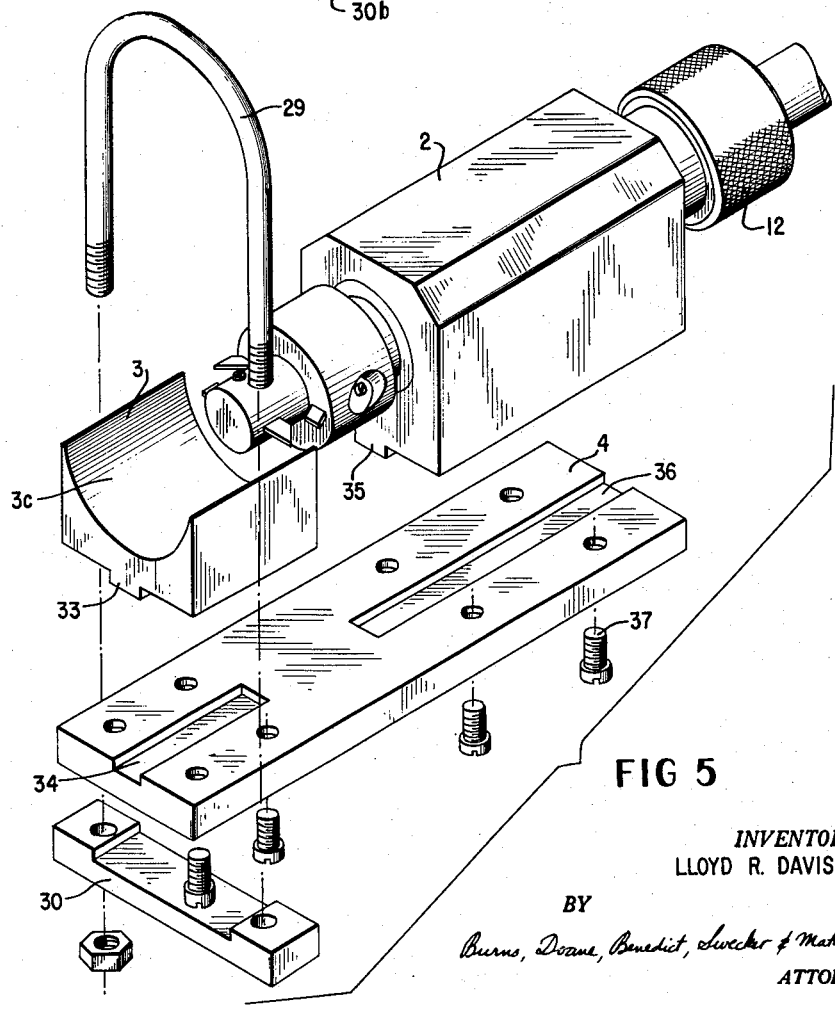
FIG 5
INVENTOR.
LLOYD R. DAVIS
BY
Burns, Doane, Benedict, Swecker & Mathis
ATTORNEYS.

Jan. 28, 1964 L. R. DAVIS 3,119,288
PORTABLE TOOL FOR MACHINING CONDUIT ENDS
Filed July 13, 1961 3 Sheets-Sheet 3

INVENTOR.
LLOYD R. DAVIS
BY
Burns, Doane, Benedict, Swecker & Mathis
ATTORNEYS.

United States Patent Office 3,119,288
Patented Jan. 28, 1964

3,119,288
PORTABLE TOOL FOR MACHINING
CONDUIT ENDS
Lloyd R. Davis, 1222 Elk Ave., Norfolk, Va.
Filed July 13, 1961, Ser. No. 123,896
8 Claims. (Cl. 77—73)

This invention relates to a portable tool for machining the end of a tubular conduit.

In preparing the ends of installed tubular conduits for welding or other fabrication operations, it is generally required that these ends be either beveled or trimmed in some fashion. For this purpose there has heretofore been provided a number of portable beveling or facing tools. These tools, however, have proven to be subject to a variety of structural and functional defects.

Because of the structurally complex and bulky character of the previously known portable beveling tools, it has been difficult to manipulate the tools so as to conveniently effect machining operations in areas of limited working space. In addition, the coupling arrangements provided in the tools for securing the tools to conduit ends have generally provided inadequate conduit end support during the beveling operation, have been unreliable in their securing action, or of such complexity so as to be unduly tedious to manipulate.

A further inadequacy of the beveling tools heretofore utilized, resides in the failure to provide adequate support and protection for their cutter assemblies. Because of this failure, the operational parts of the assemblies tend to become clogged with debris and the cutters are prone to undergoing both axial and radial movement as a result of imposed cutting stresses. These tools additionally are not readily adaptable for use in machining the ends of conduits of different sizes nor adaptable to efficiently performing deep radial cuts.

Recognizing the need for an improved, portable, conduit-end machining tool, it is an object of this invention to provide such a tool which is characterized by high operational efficiency but maximum structural simplicity and reliability.

It is a particular object of the invention to provide such a tool which facilitates the performing of conduit end machining in confined areas.

It is a further object of the invention to provide such a tool which may be conveniently and reliably engaged with a conduit end to be machined and which adequately supports this end during the machining operation.

It is also an object of this invention to provide a tool of this nature in which the cutter assembly is supported so as to prevent both axial and radial distortion during cutting operations and in which the assembly parts are adequately housed and sealed from external contamination.

A further object of the invention is to present a tool which may be utilized in machining the ends of conduits of different sizes without sacrificing machining efficiency.

A final object of the invention is to provide a tool, as previously described, which is capable of efficiency effecting deep radial cuts.

To accomplish the objects of the invention, there is contemplated a tool for machining the end of a tubular conduit, which tool includes an elongate body, a cutter support, a conduit support, and detachable clamping means for securing a conduit end to the conduit support.

The cutter support is located at one end of the elongate body and is adapted to support a cutter assembly in longitudinal alignment with the body. This support has one end disposed adjacent one end of the body and the other end disposed between the body ends. A cutter advancing sleeve is threadably engaged with and journaled within the cutter support. The sleeve projects beyond one end of the support to provide manually grippable means for imparting rotation to the sleeve. A shaft assembly, projecting from opposite ends of the advancing sleeve and rotatably carried by this sleeve, includes a shaft, a drive spindle, and a cutter blade supporting head. The shaft, coaxial with the sleeve, is journaled within the sleeve. The drive spindle is carried coaxially by the end of the shaft at the projecting end of the sleeve, while the cutter blade supporting head is carried by the other end of the shaft which projects from the other sleeve end.

The conduit support is located at the end of the body opposite to that at which the cutter support is disposed. The conduit support, including a concave seat the width of which corresponds substantially to the outer diameter of the conduit end which is to be machined, is positioned to support the conduit end in axial alignment with and facing the cutter shaft assembly. The outer sides of the support are spaced a distance corresponding substantially to the outer diameter of this conduit end.

The detachable clamping means includes a relatively thin U-shaped member having a curved end for peripherally engaging the portion of the conduit end seated in and projecting above the conduit seat. The free ends of the U-shaped member are threaded, spaced a distance corresponding substantially to the outer diameter of the conduit end, and project laterally past the conduit support sides to extend beyond the body. Threaded securing means are provided to threadably engage each of the threaded free ends of the U-shaped member to draw the curved end of the member toward the seat to thereby secure the conduit end between the seat and this curved end.

Having described the structure of the tool in general terms, its specific features will now be delineated with reference to preferred embodiments illustrated in the accompanying drawings in which:

FIGURE 3 is a vertical sectional view of the tool taken along the line 3—3 of FIGURE 2;

FIGURE 4 is a vertical sectional view of the tool taken along the line 4—4 of FIGURE 2;

FIGURE 5 illustrates a form of the tool having detachable components with the components being shown in separated form;

Figure 1:
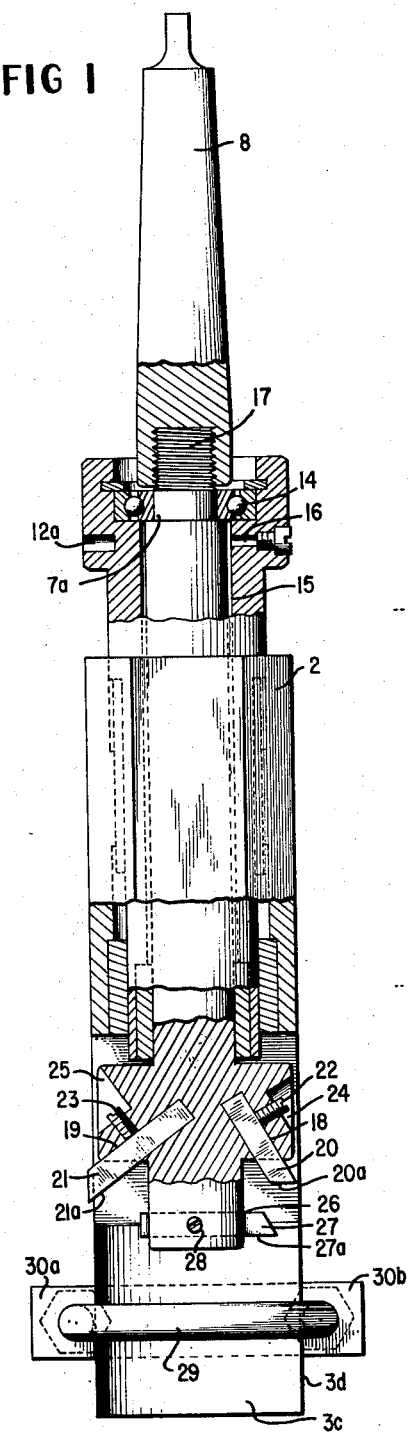
FIGURE 1 is a partially sectioned plan view of the tool.
Figure 2:
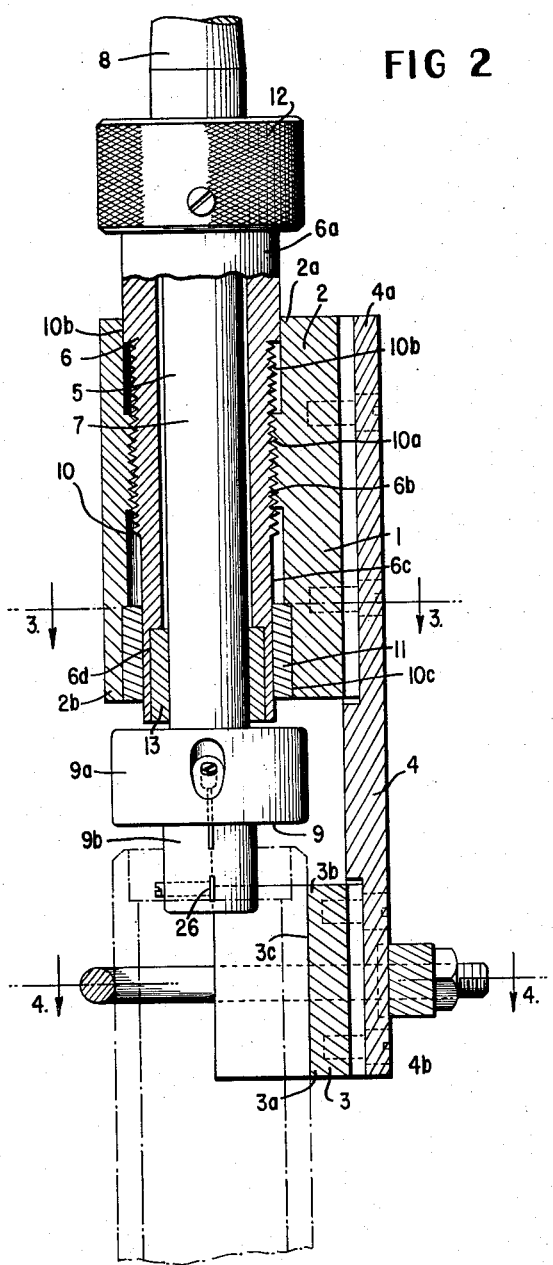
FIGURE 2 is a partially sectioned side elevational view of the tool.

The tool of this invention, as illustrated in FIGURES 1 through 4, includes an elongate body 1 having a cutter support 2 at one end, a conduit support 3 at the other end, and a base 4. The cutter support 2 is positioned such that one end 2a is disposed adjacent an end 4a of the base 4 and the other end 2b is positioned between the ends 4a and 4b of the base. The conduit support is similarly arranged with an end 3a positioned adjacent the end 4b of the base and an end 3b spaced from and facing the end 2b of the cutter support. As illustrated, both the conduit support 3 and cutter support 2 are longitudinally aligned on the base 4. Preferably, the overall width of the body corresponds substantially to the diameter of a conduit end to be machined.

In the cutter support 2, a shaft assembly 5 is rotatably journaled in a cutter advancing sleeve 6. Assembly 5, which projects from each end of sleeve 6, includes a shaft 7, a drive spindle 8, and a cutter head 9.

Cutter support 2 includes an axially extending passage 10 to telescopingly receive the cutter advancing sleeve 6. At a point intermediate the ends of the passage 10, there is formed an annular ridge 10a having a threaded aperture. The cylindrical periphery of sleeve 6 includes a bushing portion 6a having a diameter approximating that of the outer end portion 10b of the bore 10 so as to be slidably but sealingly engageable with this portion of the bore. An intermediate portion 6b of the sleeve, of lesser diameter than portion 6a, is externally threaded to form a threaded male coupling portion to engage the female threaded coupling portion provided by threaded ridge 10a of the cutter support. With the sleeve 6 inserted in the end 10b of the cutter support passage 10 and advanced into the of the cutter support passage 10 and advanced into the passage, the threaded coupling between sleeve portion 6b and passage portion 10a is sealed at one end by the telescoping engagement between bushing portion 6a of the sleeve and portion 10b of the support passage. The other end of the coupling is sealed by a bushing 11 mounted in an annular recess 10c in the end of the bore 10 adjacent end 2b of the support. Bushing 11 has an internal diameter approximating the external diameter of the inner terminal portion 6c of the sleeve so as to allow this portion of the sleeve to slidably and sealingly engage the bushing 11. Through this overall arrangement, the sleeve 6 is supported within the bore 10 of support 2 such that its opposite ends are positively supported to prevent lateral distortion and the threaded coupling between the sleeve and support is sealed. With the sleeve thus stabilized and journaled by the bushing elements, the threaded coupling prevents longitudinal movement of the sleeve in the support except as effected by deliberate rotation of the sleeve to threadably advance or withdraw the sleeve.

The end 6a of the sleeve 6 projects beyond the end 2a of the cutter support and terminates in a manually grippable, knurled knob portion 12. Knob portion 12 provides means by which the sleeve 6 may be readily grasped and rotated so as to move the sleeve longitudinally with respect to the cutter support. Where desired, of course, there may also be formed recesses 12a to facilitate engagement of a wrench with the sleeve.

Rotatably journaled within the sleeve 6 is shaft 7. Shaft 7 is supported coaxially with and spaced from the inner wall of sleeve 6 by bearing means positioned between the shaft and sleeve at each sleeve end. At the sleeve end adjacent the end 2b of the cutter support, the bearing means comprise a bushing 13 seated in an annular recess 6d in the sleeve 6. At the opposite end of the sleeve there is provided a conventional ball bearing ring 14. An annular shoulder 7a on shaft 7 engages ring bearing 14 to provide a thrust bearing preventing longitudinal shaft movement toward the ring.

In being mutually spaced, the shaft 7 and the sleeve 6 define an annular cavity 15 extending between the bearing means 14 and 13. By means of a conventional lubricant fitting, including a passageway 16 extending transversely through the knurled portion of the sleeve, means are provided for introducing lubricant material into the cavity 15 for transmission to both ring bearing 14 and bushing 13.

Shaft 7 projects beyond bearing means 14 in sleeve 6 to provide means engageable with a portable drive unit such as a pneumatic or electric motor. As illustrated, the projection includes a mandrel 17 which is threaded and coaxially secured to drive spindle 8. Spindle 8 may have a Morse taper to facilitate its connection with conventional drive mechanisms such as portable pneumatic or electric motors.

Shaft 7 also projects beyond the end of the sleeve 6 adjacent the end 2b of the support 2. This projecting end of the shaft carries the cutter blade supporting head 9 which, as illustrated, may comprise an integral portion of the shaft. Cutter head 9 includes a first cylindrical portion 9a having a diameter not exceeding the outer diameter of a conduit end to be machined and terminates in a second cylindrical portion 9b of substantially less diameter.

In the partially sectioned showing of the cutter supporting head 9 in FIGURE 1, cylindrical portion 9a includes inclined and generally outwardly directed recesses 18 and 19 adapted respectively to slidably receive cutter blades 20 and 21. Blades 20 and 21 are secured respectively by transversely extending set screws 22 and 23. To avoid the projection of the heads of the set screws above the periphery of the cutter head, peripheral notches 24 and 25 are formed in cylindrical portion 9a at the location of set screws 22 and 23 respectively.

In the second cylindrical portion 9b of the cutter head 9, there is formed a radially extending passage 26 adapted to slidably receive a radially extending cutter blade 27. Cutter blade 27 is secured by a set screw 28 extending radially of cylindrical portion 9b and transversely of recess 26.

As shown in FIGURE 1, cutter blade 20 includes a radially directed cutter face 20a adapted to form a flat land surface on the end of a conduit being machined. Cutter blade 21 includes an inclined cutter face 21a for forming a beveled surface on the outer edge of the conduit end. Cutter blade 27 includes a cutting tip 27a such that, with the blade extended to allow the tip to overlap a portion of the conduit end, an annular recess will be formed in the conduit end as the cutter advances longitudinally into the end. With the cutters positioned, as illustrated, and blade 27 extended as described, the cutter assembly will initially form an annular groove or recess in the inner wall of a conduit end seated in the conduit support 3. As the cutter head advances, a bevel will then be formed on the outer edge of the conduit end by succeeding cutter surface 21a, and finally a flat land will be formed on the conduit end by the cutter surface 20a.

The conduit support 3 is characterized by a concave, conduit end receiving seat 3c, the width of which corresponds substantially to the outer diameter of the conduit end. Obviously, however, the lips 3d of the seat may be slightly machined to eliminate sharp and potentially injurious edges. The seat is positioned to support the conduit end in axial alignment with and facing the shaft assembly. Preferably, as illustrated in FIGURE 4, the seat 3c is semi-cylindrical in configuration with a diameter corresponding substantially to the outer diameter of the conduit end. This seat configuration, of course, provides complete and uniform peripheral support for the conduit end during a machining operation and positively insures proper conduit end alignment.

The detachable clamping means for securing the conduit end to the seat 3c includes a U-bolt 29, the thickness of which is relatively small as compared with the conduit diameter. Also including in this structure is a securing bar 30 and conventional nuts 31 and 32. The U-bolt 29 includes a curved end 29a, the inner diameter of which corresponds to the outer diameter of the conduit end. With this configuration, the U-bolt 29, when placed transversely over a conduit end mounted in the seat 3c, peripherally engages the portion of the conduit end projecting above the seat so as to provide substantially uniform peripheral support for this portion of the conduit end during machining.

With the free ends of the U-bolt extending from the curved end 29a being spaced a distance corresponding substantially to the outer diameter of the conduit end, these free ends project laterally past and adjacent the conduit support sides to extend beyond the base portion 4 of the body 1. The portions 29b and 29c projecting beyond the body are threaded for mating engagement with nuts 31 and 32 respectively.

After the U-bolt is positioned in the manner described, bar 31 is mounted on the U-bolt. Bar 30 is of such a length as to provide end portions 30a and 30b projecting beyond the sides of the base 4. End portions 30a and 30b are transversely apertured to provide openings 31 and 32 adapted to slidably receive threaded end portions 29b and 29c respectively of U-bolt 29. With the bar 30 mounted on the U-bolt and extending transversely of the longitudinal axis of the body on the face of the base 4 opposite to that upon which the conduit support is mounted, nuts 31 and 32 may be threadably engaged with threaded end portions 29b and 29c projecting through apertures 31 and 32. By advancing the nuts onto the threaded end portions of the U-bolt, the bar 30 will move toward the base 4 and then draw the U-bolt toward the seat 3c so as to rigidly secure the conduit end between the seat and the curved end portion 29a of the U-bolt.

While the conduit support 3, cutter support 2, and base 4 may well comprise portions of an integral body structure, for purposes of versatile adaption to the machining of different size conduit ends, it may be desired to fabricate the cutter support and conduit support as components detachable from the base. As shown in FIGURE 5, the detachable conduit support 3 includes a longitudinally extending abutment 33 disposed on its base and conforming to a recess 34 formed in the upper face of the base 4. Similarly, detachable cutter support 2 includes a longitudinally extending abutment 35 projecting from its base and conforming to a recess 36 formed in the base 4. The abutment receiving recesses 34 and 36 are longitudinally aligned such that, with the abutment means 33 and 35 positioned in these recesses, axial alignment of the cutter support and conduit support are insured. To secure the base to the conduit support and cutter support, there may be provided a number of bolts 37 projecting transversely through the base 4 and into the conduit and cutter supports.

Where the material of conduit ends is particularly resistive to cutting action, and where machining cuts must be of substantial depth, it is desirable to provide means for continuously urging the cutter blades in the desired cutting direction. A structure for accomplishing this cutter biasing is illustrated in the modified apparatus shown in FIGURES 6 and 7.

The modified tool includes a conventional cutter support 2 in which is threadably mounted an advancing sleeve 6 in the manner heretofore described. A shaft assembly is rotatably supported within advancing sleeve 6, as in the basic structure, by bearing means 13 and 14 disposed at opposite ends of the shaft 7.

Figures 6, 7:
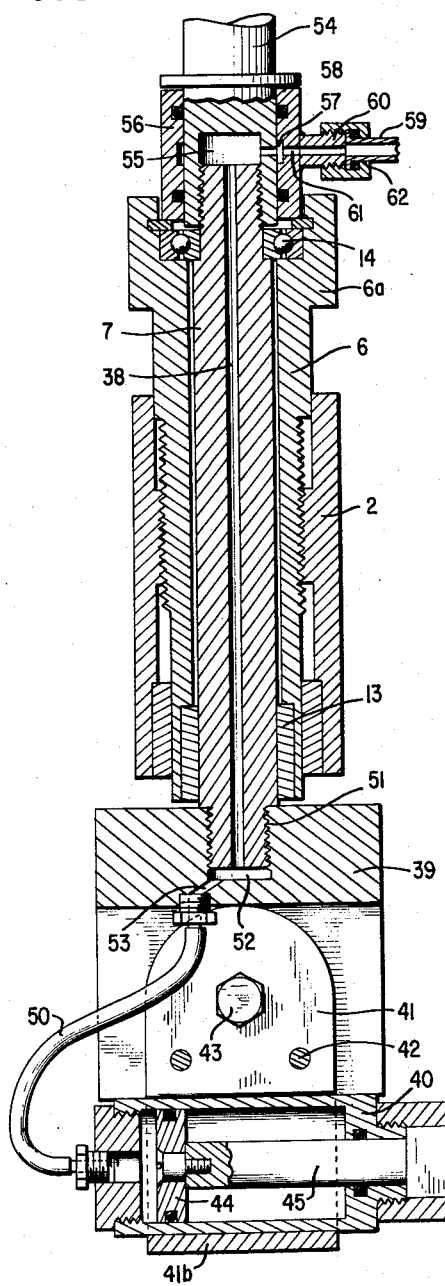
FIGURE 6 is a sectional plan view of a modified form of the tool including a hydraulically actuated, cutter translating support.
FIGURE 7 is a side elevational view of the cutter support illustrated in FIGURE 6.

In the shaft 7, there is formed a longitudinally extending bore 38. The cutter supporting head includes a generally L-shaped mount 39 to which a cylinder 40 is held by a clamp 41. As illustrated, the clamp 41 includes a terminal lip 41a which folds around the periphery of the cylinder to define a cylindrical opening. Bolts 42 are provided for anchoring the end of this portion of the clamp to rigidly secure the cylinder 40. By releasing the bolts 42, the clamp is sufficiently disengaged from the cylinder 40 to enable the cylinder to be longitudinally positioned as desired within the cylindrical recess formed by the clamp. The clamp itself is secured to the mount 39 by a bolt 43 passing through the clamp base 41b into the axially extending portion 39a of the L-shaped mount. With the base 41b of the clamp being rounded as shown in FIGURE 6, the clamp, with bolt 43 loosened, may be rotated about the bolt 43 so as to position the cylinder 40 with any desired inclination with respect to the shaft assembly axis.

Within cylinder 40 there is positioned a piston including a piston head 44 and a piston rod 45 projecting therefrom. As shown in FIGURE 7, the projecting end 45a of the piston rod has a square configuration. Through the provision of a sleeve 46 defining a continuation of cylinder 40 and providing a passage having a square cross section which slidably receives the portion 45a of the piston rod, rotation of the rod is positively prevented.

In the end of the rod 45, there is formed a transversely extending aperture 47 adapted to receive a cutter blade 48. A set screw 49 extending longitudinally through the end of the rod portion 45a to intersect the recess 47 secures the blade 48 within this recess.

A flexible conduit 50 provides fluid communication between the head end of the cylinder 40 and the end of the longitudinal bore 38 adjacent the mount 39. As illustrated in FIGURE 6, the transversely extending portion 39b of the mount 39 includes a threaded aperture 51 adapted to receive a threaded projecting end of the shaft 7. Recess 51 is of such depth as to provide a terminal cavity 52 communicating with bore 38 when the mount is assembled on the shaft. An inclined passageway 53 extends between the cavity 52 and one end of the conduit 50 to provide fluid communication between the bore 38 and the conduit. With the other end of the conduit being secured in the head end of the cylinder, a continuous path for fluid flow is provided between the bore 38 and the piston 44.

The end of the shaft 7 projecting from the projecting portion 6a of the advancing sleeve 6 is externally threaded for engagement with a drive spindle 54. Drive spindle 54 is similar to the drive spindle 8 heretofore described except that the threaded end recess adapted to receive the threaded end of the shaft 7 is elongated to provide a cavity 55.

A fluid coupling sleeve 56 is rotatably journaled on the shaft assembly. As illustrated, sleeve 56 is positioned adjacent the interconnection between the spindle 54 and the shaft 7 of the shaft assembly. On the internal surface of the sleeve, there is formed an annular recess 57 opposite the cavity 55. A transverse passage 58 extending through the wall of the coupling portion of drive spindle 54 affords fluid communication between the cavity 55 and annular recess 57.

To provide means for attaching the fluid coupling sleeve 56 to a source of pressurized hydraulic fluid, there is included conduit coupling means for attaching the sleeve to a fluid supplying conduit 59. This coupling means includes a stub conduit section 60 extending from the outer periphery of sleeve 56. The interior of conduit section 60 communicates with annular recess 57 by means of a transverse passage 61 in the wall of the sleeve 56. A conventional threaded coupling collar 62 secures the ends of the conduit 59 and conduit section 60 in sealing engagement. With the conduit 59 thus connected to the coupling sleeve 56, there is achieved continuous fluid communication between the conduit 59 and the piston 44. Thus fluid pressure introduced through the conduit 59 is effective to bias the piston 44 outwardly and, through means of the piston rod 45, urge the piston rod carried cutter blade 48 outwardly.

With the clamp and cylinder disposed as shown in FIGURE 6, the tool is adapted for machining radial cuts. It is apparent, however, that by varying the position of the clamp 41 and thus the orientation of the cylinder 40 with respect to the shaft assembly, the advancing direction of the cutter blade 48 may be modified in accordance with job requirements.

In describing the structural details of the tool of this invention, its several operational advantages have been demonstrated. The conduit periphery conforming nature of the support seat and clamp insure uniform support for conduit ends to avoid cutter induced distortion. The limited lateral width of the conduit end support and its associated detachable clamp enables the tool to be used in particularly confined quarters. In boiler installations, for example, the boiler tubes extend in parallel alignment in a nearly contiguous relationship. By having spaced the sides of the conduit end support so that they correspond substantially to the outer diameter of the conduit end, the support may be moved into supporting relation with a conduit end with little or no difficulty. By virtue of the detachable nature of the U-clamp, the conduit end and U-clamp may be manipulated in whatever manner is most convenient to effect the securing of the conduit end. Because of the relatively thin nature of the U-clamp, only nominal lateral spacing is required on the sides of a conduit for installation and securing of the tool.

In certain installations, a conduit end to be machined may terminate between parallel and uninterrupted conduits or between other structural elements. As the overall width of the preferred form of the tool corresponds substantially to the conduit width, the tool may readily be inserted between the parallel conduits or elements for engagement with this conduit end.

The structure of the cutter supporting head in and of itself is particularly advantageous. The cylindrical portion of the head adjacent the shaft has an outer diameter not exceeding the outer diameter of a conduit end to be machined, shown in phantom lines in FIGURE 2. Through this arrangement, adequate support is provided for the inclined and outwardly directed cutter blades while the head advances and the blades cut into the conduit end.

Although in many installations, where conduit ends to be machined are of constant size, the tool would be employed in a form in which the cutter support and conduit end support are integral with the base of the body, it is contemplated that the illustrated, detachable component, form of the tool would find particular utility. In many industrial operations, it would be expected that conduit ends of varying sizes would require machining. With the detachable arrangement described, the tool may be adapted to conduit ends of the required size while retaining the rugged tool characteristics which contribute to precise machining operations. The abutment aligning means positively assure that a proper arrangement of tool components will be obtained for each machining operation.

Where job requirements demand extensive radial cuts or radial cuts in particularly resistive material, the hydraulic cutting head would prove especially useful. The dual adjustability of the cutter support, i.e. the axial movability of the cylinder and the pivotal character of the cylinder clamp, enables the cutting support to be arranged so as to provide cutter biasing at any desired angle.

Of particular significance is the structural arrangement for supporting the cutter assembly. The drive sleeve is arranged so as to be stabilized with respect to both axial and radial movement. The threaded advancing sleeve coupling is sealed against contamination which might interfere with ease of sleeve movement during cutter advancing. Similarly, the shaft is supported within the sleeve for both radial and axial stability and so as to insure ease of rotation.

The overall ruggedness of the tool and its few working parts assure maximum efficiency of performance and nominal maintenance.

While the tool of this invention has been described with reference to particular preferred embodiments, variations from these embodiments may occur to those skilled in the art which are well within the scope of the invention as defined in the appended claims.

I claim:

1. A tool for machining the end of a tubular conduit, said tool comprising an elongate body; a cutter support at one end of said body for rotatably supporting a shaft assembly in longitudinal alignment with said body, said cutter support having one end adjacent said one end of said body and another end between said body ends; a cutter advancing sleeve threadably engaged with and journaled within said cutter support and projecting beyond said one end of said support to provide means for imparting rotation to said sleeve, said advancing sleeve further including a peripherally threaded portion disposed intermediate its ends for engagement with an internally threaded portion of said cutter support and said advancing sleeve being sealingly supported within said support by bushing means disposed between said advancing sleeve and said support at each end of said support; a shaft assembly projecting from opposite ends of and rotatably carried by said advancing sleeve, said assembly including a shaft coaxial with said sleeve and journaled therewithin, a drive spindle coaxial with and carried by the end of said shaft at the projecting end of said advancing sleeve, and a cutter blade supporting head carried by the other end of said shaft; a conduit support at the opposite end of said body, said conduit support having a concave seat the width of which corresponds substantially to the outer diameter of said conduit end and which is positioned to support said conduit end in axial alignment with and facing said shaft assembly, said support further having outer sides spaced a distance corresponding substantially to the outer diameter of said conduit end; and detachable clamping means for securing said conduit end to said conduit seat, said clamping means including a relatively thin, U-shaped member having a curved end for peripherally engaging the portion of said conduit end projecting above said conduit seat, and having threaded, free ends spaced a distance corresponding substantially to the outer diameter of said conduit end and projecting laterally past said conduit support sides to extend beyond said body, and threaded securing means adapted to threadably engage each of said threaded free ends of said U-shaped member to draw said member toward said seat to thereby secure said conduit end between said seat and said curved end of said member.

2. A tool for machining the end of a tubular conduit as described in claim 1 wherein said shaft of said shaft assembly is supported within said advancing sleeve by bearing means positioned between the shaft and advancing sleeve at each advancing sleeve end, with said bearing means spacing said shaft from said advancing sleeve to provide an annular, lubricant receiving cavity.

3. A tool for machining the end of a tubular conduit, said tool comprising: an elongate body; a cutter support at one end of said body for rotatably supporting a shaft assembly in longitudinal alignment with said body, said cutter support having one end adjacent said one end of said body and another end between said body ends; a cutter advancing sleeve threadably engaged with and journaled within said cutter support and projecting beyond said one end of said support to provide means for imparting rotation to said sleeve; a shaft assembly projecting from opposite ends of and rotatably carried by said advancing sleeve, said assembly including a shaft coaxial with said sleeve and journaled therewithin, a drive spindle coaxial with and carried by the end of said shaft at the projecting end of said advancing sleeve, and a cutter blade supporting head carried by the other end of said shaft, said shaft including a longitudinally extending bore and said cutter blade supporting head including a cylinder and a piston within said cylinder having a rod projecting therefrom and supporting a cutter blade and said bore having one end adjacent said supporting head and in fluid communication with the piston head end of said cylinder; a fluid coupling sleeve sealingly journaled on the end of said shaft assembly projecting from the projecting end of said sleeve, said coupling sleeve having an internally disposed annular recess, a transverse passage communicating with said annular recess, and conduit coupling means mounted externally on said sleeve and in fluid communication with said transverse passage, said shaft assembly, adjacent said coupling sleeve, further having a transverse passage providing fluid communication between said longitudinally extending bore of said shaft and said annular recess of said coupling sleeve; a conduit support at the opposite end of said body, said conduit support having a concave seat the width of which corresponds substantially to the outer diameter of said conduit end and which is positioned to support said conduit end in axial alignment with and facing said shaft assembly, said support further having outer sides spaced a distance corresponding substantially to the outer diameter of said conduit end; and detachable clamping means for securing said conduit end to said conduit seat, said clamping means including a relatively thin, U-shaped member having a curved end for peripherally engaging the portion of said conduit end projecting above said conduit seat and having threaded, free ends spaced a distance corresponding substantially to the outer diameter of said conduit end and projecting laterally past said conduit support sides to extend beyond said body, and threaded securing means adapted to threadably engage each of said threaded free ends of said U-shaped member to draw said member toward said seat to thereby secure said conduit end between said seat and said curved end of said member.

4. A tool for machining the end of a tubular conduit, said tool comprising:
  an elongate body;
  a cutter support at one end of said body for rotatably supporting a shaft assembly in longitudinal alignment with said body, said cutter support having one end adjacent said one end of said body and another end between said body ends;
  a cutter advancing sleeve threadably engaged with and journaled within said cutter support and projecting beyond said one end of said support to provide means for imparting rotation to said sleeve;
  a shaft assembly projecting from opposite ends of and rotatably carried by said advancing sleeve, said assembly including
    a shaft coaxial with said sleeve and journaled therewithin,
    a drive spindle coaxial with and carried by the end of said shaft at the project end of said advancing sleeve, and
    a cutter blade supporting head carried by the other end of said shaft;
      said cutter blade supporting head including a first cylindrical portion adjacent said shaft having a diameter not exceeding the outer diameter of said conduit end,
      said first cylindrical portion of said cutter blade supporting head including means for supporting a plurality of cutter blades such that they are inclined with respect to the axis of said shaft and project outwardly from said first cylindrical portion,
      said cutter blade supporting head terminating in a second cylindrical portion having a diameter less than that of said first cylindrical portion and less than the inner diameter of said conduit end, and
      said second cylindrical portion of said cutter blade supporting head including means for supporting a radially extending cutter blade;
  a conduit support at the opposite end of said body, said conduit support having
    a concave seat the width of which corresponds substantially to the outer diameter of said conduit end and which is positioned to support said conduit end in axial alignment with and facing said shaft assembly, with said seat being semi-cylindrical in configuration and having a diameter corresponding substantially to the outer diameter of said conduit end, and
    outer side portions spaced a distance corresponding substantially to the outer diameter of said conduit end; and
  detachable clamping means for securing said conduit end to said conduit seat,
    said clamping means including a relatively thin, U-shaped member having a curved end for peripherally engaging the portion of said conduit end projecting above said conduit seat,
    said curved end having an arcuate surface facing said seat, which arcuate surface has a diameter corresponding substantially to the outer diameter of said conduit end,
    said U-shaped member further having threaded, free ends spaced a distance corresponding substantially to the outer diameter of said conduit end and projecting laterally past said conduit support side portions to extend beyond said body, and
    said clamping means further including threaded securing means adapted to threadably engage each of said threaded free ends of said U-shaped member to draw said member toward said seat whereby said concave seat of said conduit support and said arcuate surface of said U-shaped member cooperate to define a conduit end clamp circumscribing and substantially uniformly engaging the periphery of said conduit end to thereby secure said conduit end between said seat and said curved end of said member.

5. A tool for machining the end of a tubular conduit as described in claim 4 wherein said clamping means includes a bar engaging said body on a face diametrically opposite to that upon which said concave seat is positioned, with said bar being disposed transversely to the longitudinal axis of said body and having ends projecting from opposite sides of said body; said projecting ends each being apertured to receive a threaded free end of said U-shaped member; and wherein said threaded securing means includes a threaded nut to engage each threaded free end of said U-shaped member projecting through a bar aperture.

6. A tool for machining the end of a tubular conduit as described in claim 4:
  wherein said elongate body has a width corresponding substantially to the diameter of a conduit end to be machined;
  wherein said elongate body includes a base upon which said cutter support and said conduit support are detachably mounted; and
  wherein said tool further includes:
    first abutment means between said cutter support and said base, and
    second abutment means between said conduit support and said base,
      said first and second abutment means serving to axially align said cutter and conduit supports on said base.

7. A tool for machining the end of a tubular conduit, said tool comprising: an elongate body; a cutter support at one end of said body for rotatably supporting a shaft assembly in longitudinal alignment with said body, a shaft assembly projecting from opposite ends of and rotatably carried by said cutter support; said assembly including a shaft, a drive spindle coaxial with and carried by one end of said shaft, and a cutter supporting head carried by the other end of said shaft; said shaft assembly including a longitudinally extending bore, and said cutter supporting head including a cylinder and a piston within said cylinder having a rod projecting therefrom and supporting a cutter blade; a fluid coupling sleeve sealingly journaled on one end of said shaft assembly projecting from said cutter support, said coupling sleeve having an internally disposed annular recess, a transverse passage communicating with said annular recess, and conduit coupling means mounted externally on said sleeve and in fluid communication with said transverse passage; said shaft assembly, adjacent said coupling sleeve, further having a transverse passage providing fluid communication between said longitudinally extending bore of said shaft and said annular recess of said coupling sleeve; conduit means extending between the head end of said cylinder and shaft assembly to provide fluid communication between said bore and said piston; and conduit support means at the end of said body opposite to that at which said cutter support is disposed for supporting a conduit end in axial alignment with and facing said cutter supporting head.

8. A tool for machining the end of a tubular conduit as described in claim 7 and including clamp means pivotally secured to said cutter supporting head for supporting said cylinder in transverse alignment with respect to said shaft assembly, said clamp means being releasable from said cylinder to permit the position of said cylinder in said clamp means to be axially adjusted.

References Cited in the file of this patent

UNITED STATES PATENTS

| | | |
|---|---|---|
| 320,748 | Bartholomew | June 23, 1885 |
| 1,038,881 | Hatton | Sept. 17, 1912 |
| 1,204,994 | Kendall | Nov. 14, 1916 |